(12) United States Patent
Faure et al.

(10) Patent No.: US 12,510,861 B2
(45) Date of Patent: Dec. 30, 2025

(54) FOCUS ADJUSTMENT METHOD FOR HOLOGRAPHIC IMAGING SYSTEM

(71) Applicants: Biomerieux, Marcy l'Etoile (FR); Universite Jean Monnet Saint Etienne, Saint-Etienne (FR); Centre National de la Recherche Scientifique (CNRS), Paris (FR)

(72) Inventors: Nicolas Faure, Grenoble (FR); Frédéric Pinston, Grenoble (FR); Corinne Fournier, Saint-Etienne (FR); Loïc Denis, Saint-Etienne (FR); Thomas Olivier, Saint-Etienne (FR)

(73) Assignees: Biomerieux (FR); Universite Jean Monnet Saint Etienne (FR); Centre National de la Recherche Scientifique (CNRS) (FR)

( * ) Notice: Subject to any disclaimer, the term of this patent is extended or adjusted under 35 U.S.C. 154(b) by 390 days.

(21) Appl. No.: 18/012,045

(22) PCT Filed: Jun. 23, 2021

(86) PCT No.: PCT/FR2021/051141
§ 371 (c)(1),
(2) Date: Dec. 21, 2022

(87) PCT Pub. No.: WO2021/260321
PCT Pub. Date: Dec. 30, 2021

(65) Prior Publication Data
US 2023/0236542 A1 Jul. 27, 2023

(30) Foreign Application Priority Data
Jun. 24, 2020 (FR) ...................................... 2006613

(51) Int. Cl.
*G03H 1/04* (2006.01)
*G03H 1/00* (2006.01)
(Continued)

(52) U.S. Cl.
CPC ......... *G03H 1/0406* (2013.01); *G03H 1/0005* (2013.01); *G03H 1/02* (2013.01);
(Continued)

(58) Field of Classification Search
CPC ... G02B 7/28; G02B 7/36; G02B 7/38; G03H 1/0406; G03H 1/0005; G03H 1/02;
(Continued)

(56) References Cited

U.S. PATENT DOCUMENTS 4,585,349 A * 4/1986 Gross .................... G01B 11/026
356/624
10,255,688 B2 * 4/2019 Perraut .................... G06T 15/10
(Continued)

FOREIGN PATENT DOCUMENTS

| CN | 107110762 A | 8/2017 |
| CN | 108254295 A | 7/2018 |
| EP | 3339835 A1 | 6/2018 |

OTHER PUBLICATIONS

Liebling, Mr. & Unser, M. "Autofocus for digital Fresnel holograms by use of a Fresnelet-sparsity criterion" JOSA A 21, 2424-2430 (Dec. 2004). 8 pgs.
(Continued)

*Primary Examiner* — Arnel C Lavarias
(74) *Attorney, Agent, or Firm* — Lerner David LLP (57) ABSTRACT

A focus adjustment method for acquiring an image of a surface of interest of a sample by a holographic imager includes the steps of:
placing the sample including at least one reference object having a known shape and described by characterising parameters having at least position parameters
(Continued)

acquiring an image and determining the position of the reference object with respect to the acquisition plane, by applying a light diffraction model involving the spatial parameters of the reference object estimated by approximating the appearance of the reference object in the holographic image acquired, and determining the position of the surface of interest with respect to the acquisition plane from a position of the reference object and focus adjustment of the image acquisition.

17 Claims, 2 Drawing Sheets

(51) Int. Cl.
    *G03H 1/02*     (2006.01)
    *G03H 1/08*     (2006.01)

(52) U.S. Cl.
    CPC ... *G03H 1/0808* (2013.01); *G03H 2001/0044* (2013.01); *G03H 2001/0088* (2013.01); *G03H 2001/0204* (2013.01); *G03H 2001/0212* (2013.01); *G03H 2210/50* (2013.01)

(58) Field of Classification Search
    CPC ......... G03H 1/0808; G03H 2001/0044; G03H 2001/0088; G03H 2001/0204; G03H 2001/0212; G03H 2210/50; G03H 1/00; G03H 2001/005; G03H 1/0404; G03H 1/0443; G03H 2001/0447; G03H 2001/0471
    USPC ............... 359/1, 9, 22, 32, 33; 430/1, 2; 250/201.2, 550

See application file for complete search history.

(56) References Cited

U.S. PATENT DOCUMENTS

| | | | |
|---|---|---|---|
| 2017/0284926 A1* | 10/2017 | Perraut | G03H 1/0866 |
| 2017/0309036 A1 | 10/2017 | Perraut et al. | |
| 2017/0363533 A1* | 12/2017 | Perraut | G01N 15/1434 |
| 2018/0180527 A1 | 6/2018 | Zhou | |

OTHER PUBLICATIONS

Dubois, F., Schockaert, C., Callens, N. & Yourassowsky, C. "Focus plane detection criteria in digital holography microscopy by amplitude analysis" Opt. Express 14, pp. 5895-5908 (Jun. 2006).

Trujillo, C. A. & Garcia-Sucerquia, J. "Automatic method for focusing biological specimens in digital lensless holographic microscopy" Opt. Lett. 39, pp. 2569-2572 (May 2014).

International Search Report for PCT/FR2021/051141 mailed Sep. 29, 2021. 3 pgs.

* cited by examiner

FOCUS ADJUSTMENT METHOD FOR HOLOGRAPHIC IMAGING SYSTEM

CROSS-REFERENCE TO RELATED APPLICATIONS

The present application is a national phase entry under 35 U.S.C § 371 of International Application No. PCT/FR2021/051141 filed Jun. 23, 2021, which claims priority from French Application No. 2006613 filed Jun. 24, 2020, all of which are hereby incorporated herein by reference.

TECHNICAL FIELD

The present invention relates to the field of imaging, and more precisely addresses locating a surface of interest in a sample by holographic methods, for the purpose of focus adjustment for acquiring an image of that surface of interest.

TECHNOLOGICAL BACKGROUND

Several focus adjustment methods for imaging have been developed. These are methods for accurately measuring the position of a surface of interest, typically a plane, so as to be able to set/choose the object focal plane of an imaging system, and thus be able to acquire quality images of that surface of interest.

For example, EP 3,339,835 provides a method consisting in directing a wavefront of coherent radiation through a sample of objects in a suspension, capturing an interference diagram between the wavefront of the coherent radiation and a wavefront of the radiation diffracted by the object with an image sensor, digitally determining the focal plane of at least one object, and digitally reconstructing an unfocused image of at least one object from the interference pattern in an image plane that is substantially parallel to the image sensor and in a plane with a predetermined offset relative to the focal plane. The method further comprises identifying at least one part of the defocused image corresponding to at least one object in the sample, and calculating from each of said parts at least one characteristic of the corresponding object.

The method provided by EP 3,339,835 is simple to implement, but the step of determining the focal plane of at least one object is carried out by a conventional autofocus algorithm having various drawbacks, such as a lack of accuracy, several of which are explained below. The position of the object focal plane of a holographic imaging system, which corresponds to a surface where the objects to be imaged have to be positioned to maximise quality of the images generated (sharpness, contrast, etc.), can be roughly estimated by knowing the optical characteristics (for example, focal distance) of the holographic imaging system, and its positioning. However, several difficulties arise. For example, within the context of holographic microscopy, the objects to be imaged in a surface of interest are typically in the micrometre size range, so that a positioning error of a few micrometres of the object focal plane has great consequences for the quality of the images obtained. Thus, even in the simplest case where the surface of interest to be imaged corresponds to the physical holder of a flat sample (case of a microscope slide), focus adjustment is important and can be complex and tedious. Sill further, in the case where a sample is a complex or three-dimensional object, the surface of interest that it is desired to be imaged may not be in a known position as the surface of a holder of the sample, but for example at a certain distance from that surface. Such a sample may also have several surfaces of interest to be imaged, at different positions with respect to the imaging system. Furthermore, just like the surface of interest, the object focal surface (generally called "focal plane" through misuse of language) may not be a planar surface in the presence of optical aberrations.

In practice, it is often necessary to acquire and analyse a series of images acquired at different positions on the optical axis, that is, at different z-coordinates on the optical axis, describing the relative positions of the sample with respect to the image sensor. Descriptors are extracted from each of these images, and merit factors are derived therefrom to identify a quality image whose z-coordinates are estimated to be those of the focal plane. These methods are based on the hypothesis that in the focal plane, image contrast is maximum, and merit factors refer to maximising local contrasts, gradients, variance, entropy, power spectral density, etc.

While such assumptions are relevant in some cases, in particular when opaque objects are present in the focal plane, these methods are not adapted for all situations. For example, bright-field microscopy of non-light absorbing objects shows very low contrasts, even in the focal plane, and most quality factors may not be maximised in such a situation.

Other methods can only be used under specific material conditions. For example, certain focus adjustment criteria can only be used for objects being as pure phase shifters or amplitude absorbers. This is for example the case in Liebling, Mr. & Unser, M. *"Autofocus for digital Fresnel holograms by use of a Fresnelet-sparsity criterion"* JOSA A 21, 2424-2430 (2004), Dubois, F., Schockaert, C., Callens, N. & Yourassowsky, C. *"Focus plane detection criteria in digital holography microscopy by amplitude analysis"* Opt. Express 14, 5895-5908 (2006), and Trujillo, C. A. & Garcia-Sucerquia, J. *"Automatic method for focusing biological specimens in digital lensless holographic microscopy"* Opt. Lett. 39, 2569-2572 (2014).

Other criteria require the use of several wavelengths for illumination light, which can be difficult experimentally, and still rely on certain assumptions regarding the dependence of the absorption and phase shift of the imaged object as a function of the wavelength.

It could be possible to add particles whose optical characteristics are known to the sample, in order to use them for focus adjustment via merit factors. For example, gold particles, which exhibit very high amplitude contrast in the focal plane, and minimal phase contrast, can be used for this purpose. For example, Bon, P. et al. *"Three-dimensional nanometre localization of nanoparticles to enhance super-resolution microscopy."* Nat. Comm. 6, 7764 (2015), provides such a method. However, this approach requires accurate phase and amplitude measurements, therefore requiring dedicated optical equipment.

DISCLOSURE OF THE INVENTION

The invention aims to enable focus adjustment, for acquiring an image by an image sensor, of a surface of interest in a sample, without resorting to sophisticated equipment, even under disadvantageous conditions such as bright-field imaging of low contrast objects.

For this purpose, the invention provides a focus adjustment method for acquiring an image of a surface of interest of a sample by an image sensor of an imaging system, comprising the following steps of:

placing the sample, in which the surface of interest is located in the field-of-view of the image sensor of the imaging system, the sample comprising at least one reference object having a known shape and described by characterising parameters associated with the reference object and comprising at least position parameters, of the reference object, the reference object being at a position in correspondence with a position of the surface of interest, illuminating the sample by an illumination light and acquiring a holographic image by the image sensor at an acquisition plane, of the interference patterns caused by the reference object, determining the position of the reference object with respect to the acquisition plane, using a light diffraction model by the at least one reference object, the diffraction model being a function of the known shape of the reference object and involving the characterising parameters associated with the reference object, at least the position parameters of the reference object being estimated by adjustment in the light diffraction model to approximate the interference patterns caused by the reference object in the holographic image, determining the position of the surface of interest with respect to the acquisition plane from a position of the reference object defined by the position parameters, performing focus adjustment of the image acquisition based on the position of the surface of interest relative to the acquisition plane.

The method makes it possible to perform focus adjustment by making the position of the surface of interest coincide with the acquisition plane of the image sensor, by analysing a simple two-dimensional image. Unlike previously used methods, the method according to the invention does not require phase reconstruction on the acquisition plane, does not require illumination at several wavelengths, nor does it require mechanical scanning analysis of several z-positions on the optical axis of the sample.

The invention is advantageously supplemented by the following different characteristics taken alone or according to their different possible combinations:

the reference object is an artificial object added to the sample, or the reference object is a microorganism present in the sample;

the reference object has a spherical, cylindrical or ellipsoidal shape;

the light diffraction model is the Mie, generalised Mie, Thompson, or Rayleigh model;

the characterising parameters associated with a reference object also comprise geometric parameters describing the known shape of the reference object;

the geometric parameters of the reference object are estimated by adjustment in the light diffraction model to approximate the interference patterns caused by the reference object in the holographic image;

the characterising parameters associated with the reference object comprise a refractive index of the reference object which is estimated by adjustment in the light diffraction model to approximate the interference patterns caused by the reference object in the holographic image;

the sample is placed in an immersion medium, and the light diffraction model implies a refractive index of said immersion medium which is estimated by adjustment in the light diffraction model to approximate the interference patterns caused by the reference object in the holographic image;

the sample comprises at least three reference objects not aligned in the field-of-view of the image sensor, whose position parameters with respect to the acquisition plane are determined, and determining the position of the reference surface comprises determining a position of a reference surface in which the reference objects are arranged, the position of the surface of interest being determined from the position of the reference surface by the correspondence between the positions of the reference objects and the position of the surface of interest;

the position parameters of the reference objects comprise position coordinates relative to the acquisition plane, and the position of the reference surface is determined by interpolation of the position coordinates of the reference objects followed by a determination of parametric coordinates of the reference surface relative to the acquisition plane;

several holographic images are acquired by the image sensor at different positions of the acquisition plane and/or with different wavelengths for the illumination light, and for each of the holographic images, the position of the at least one reference object with respect to the acquisition plane of said holographic image is determined, determining the position of the surface of interest involving several positions of the at least one reference object;

focus adjustment of the image acquisition comprises the relative displacement the sample and image sensor at least along the optical axis of the imaging system, over a displacement distance derived from the position of the surface of interest with respect to the acquisition plane;

focus adjustment of the image acquisition comprises the modification of an optical member of the imaging system displacing the acquisition plane;

focus adjustment of the image is a digital focus adjustment comprising transformation of the holographic image acquired using a propagation model involving the position of the surface of interest with respect to the acquisition plane.

The invention also relates to a holographic imaging system comprising:

an image sensor configured to acquire a holographic image at an acquisition plane in a field-of-view, a light source configured to illuminate a sample disposed in the field-of-view of the image sensor, the sample comprising a surface of interest and comprising at least one reference object having a known shape and described by characterising parameters associated with the reference object, the characterising parameters comprising at least position parameters, the reference object being at a position in correspondence with the position of the surface of interest, an automated data processing system configured to receive the holographic image acquired by the image sensor and to determine the position of the reference object with respect to the acquisition plane, using a light diffraction model by the at least one reference object, the diffraction model being a function of the known shape of the reference object and involving the characterising parameters associated with the reference object, at least the position parameters of the reference object being estimated by adjustment in the light diffraction model to approximate the interference patterns caused by the reference object in the holographic image, and to determine the position of the surface of interest with respect to the acquisition plane from a position of the reference object defined by the position parameters, the holographic imaging system being configured for the implementation of a focus adjustment method for acquiring an image of the surface of interest of the sample by the image sensor according to the invention.

BRIEF DESCRIPTION OF THE FIGURES

Other characteristics, purposes and advantages of the invention will be apparent from the following description, which is purely illustrative and not limiting, and which should be read with respect to the appended drawings in which.

DETAILED DESCRIPTION

Figure 1:
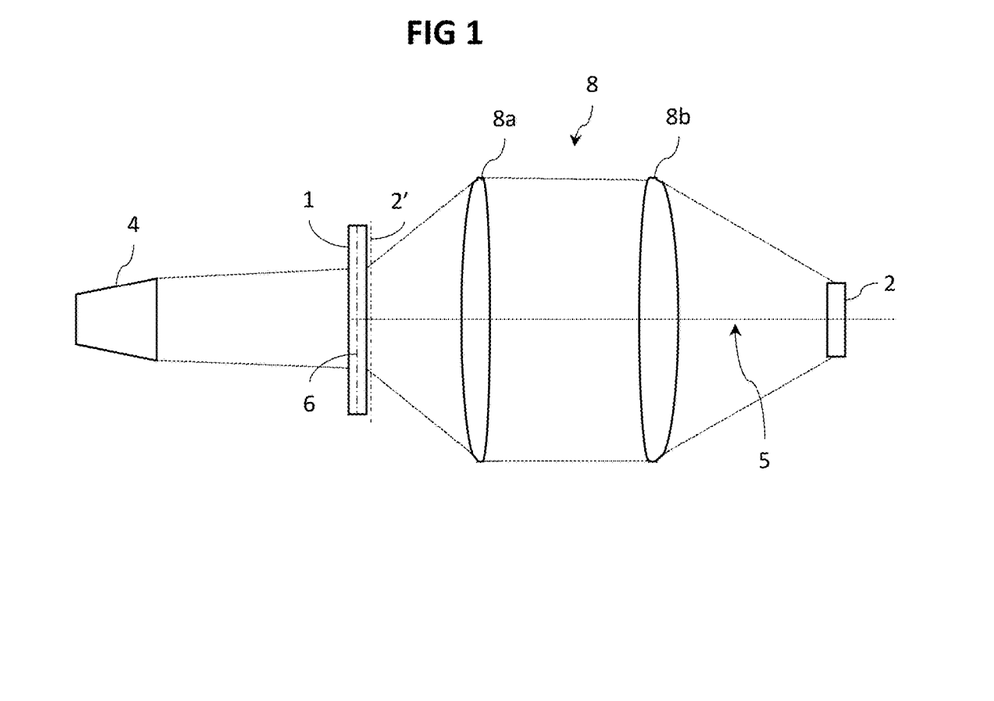
FIG. 1 is a simplified schematic view of a holographic imaging system according to one possible embodiment of the invention.

FIG. 1 schematically represents an imaging system, which here is an online holographic imaging system to image a sample 1 by means of a digital image sensor 2, placed in an image plane of the holographic imaging system. The imaging system is referred to as a holographic imaging system in that it is capable of acquiring holographic images, but this same imaging system could also acquire non-holographic images. An optical axis 5 connects the sample 1 and the image sensor 2. Here, this optical axis 5 is shown rectilinear, but could be more complex, as a function of the configurations. A light source 4 is configured to illuminate the sample 1 in the field-of-view of the holographic imaging system by means of an illumination beam of illumination light that is sufficiently coherent for the acquisition of a hologram, that is, coherent or partially coherent. The illumination light has the conventional characteristics for holographic imaging, with no particular additional restrictions. The illumination light can thus be monochromatic (for example, with a wavelength around 500 nm) or possibly be composed of several wavelengths, for example used one after the other. The imaging system may comprise a set of optical members 8 on the light path between the sample 1 and the image sensor 2. In the illustrated example, the holographic imaging system is equipped with a microscope objective 8a and a tube lens 8b, disposed between the sample 1 and the digital image sensor 2. An optical member such as the microscope objective 8a is, however, optional, the invention not being limited to holographic microscopy with lens or a particular set of optical members. Of course, the arrangement described here is a non-limiting example. Any holographic imaging system can be used, online or offline, with or without a microscope objective, etc. Indeed, the method relies on the use of a holographic image acquired by an imaging system. Thus, as long as an imaging system can acquire a holographic image in which the interference patterns caused by the reference objects appear, this imaging system is suitable for the implementation of the method. The imaging system also comprises an automated data processing system, not represented, comprising at least one processor, a memory, and which is configured to receive at least one holographic image from the image sensor 2 and to process this holographic image in order to determine a position of the surface of interest 6 with respect to the holographic imaging system (and in particular with respect to its acquisition plane 2').

Figure 2:
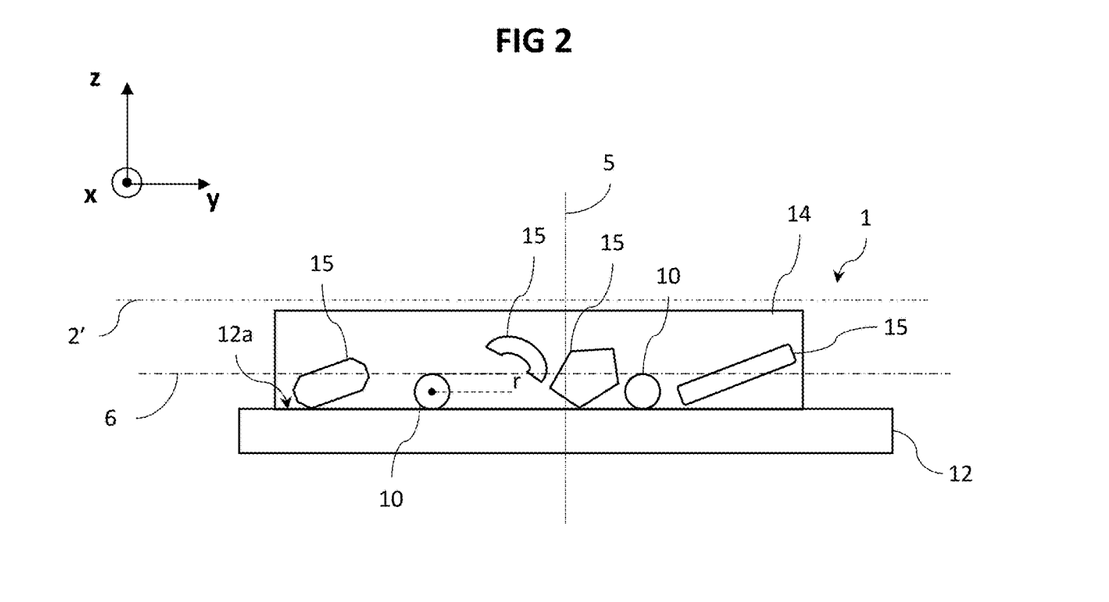
FIG. 2 is a schematic cross-sectional view of a sample having a surface of interest and reference objects, according to one possible embodiment of the invention.

The sample 1 comprises the surface of interest 6 that is to be imaged. The surface of interest 6 may be planar in the simplest case, or curved. The surface of interest 6 may extend in a plane perpendicular to the optical axis 5, or may have a tilt with respect to a plane perpendicular to the optical axis 5. The position of the surface of interest 6 is defined as the spatial disposition of the surface of interest 6, including its location and possible tilt, in the imaging system. The surface of interest 6 may be part of the sample 1, in particular when the sample 1 is a three-dimensional object having a certain volume containing several surfaces or layers at several positions on the optical axis 5. More generally, the surface of interest 6 corresponds to the location of the part of the sample 1 that is attempted to be imaged. Usually, the sample 1 rests on a holder 12, such as a microscope slide, and the surface of interest 6 can advantageously correspond to the interface 12a between the holder 12 and the sample 1, or to a surface parallel to this interface 12a as in the example illustrated, or at least whose position can be deduced from the position of the interface 12a between the holder 12 and the sample 1. It should be noted that the choice of the surface of interest 6 may benefit from a form of a priori knowledge on the sample 1 and what is to be observed, such as the size of microorganisms 15 present in the sample 1 and likely to rest on the holder 12.

The sample 1 comprises at least one reference object 10 which is at a position corresponding to the position of the surface of interest 6. A reference object 10 has a known shape. This shape is known because it can be described by geometric parameters. Alternatively, the shape may be known only in terms of size of the reference object 10, at least with respect to the wavelength of the illumination light, for example when the reference object 10 is in a borderline case of Rayleigh scattering, that is, with a dimension 5 to 10 times smaller than this wavelength. In this case, there are no geometric parameters. Preferably, the sample 1 comprises several reference objects 10, at least 3 reference objects 10, and still preferably at least 5 reference objects 10. If it is possible that the sample 1 contains a multitude of reference objects 10, it is usually not necessary that more than one or two dozen reference objects 10 appear in an acquired image.

The characterising parameters associated with the reference objects 10 comprise at least position parameters locating each of the reference objects 10 individually, typically position coordinates. By position of a reference object 10, it is meant the spatial disposition of the reference object 10, including its location and possible tilt, in the imaging system. Preferably, the characterising parameters associated with the reference objects 10 also include geometric parameters describing the known shape of the reference objects 10. The geometric parameters correspond to a priori knowledge of the geometric shape of the reference objects 10. In this respect, the reference objects 10 have a simple geometric shape, and preferably, a reference object 10 has a spherical, cylindrical or ellipsoidal shape. In the case of a reference object 10 having a spherical shape, the geometric parameters may simply consist of the radius of a sphere modelling the reference object 10, the position coordinates then corresponding to the position of the centre of that sphere. More generally, the geometric parameters are those taken into account by the light diffraction model that will be used (for example, the Mie model, the generalised Mie model, the Thompson model, or the Rayleigh model). Thus, for a basically spherical reference object 10, the Mie light diffraction model (or Lorenz-Mie solution) only requires the radius of the sphere as a geometric parameter. In the case of a reference object 10 with a basically cylindrical shape, a radius and a length constitute the only geometric parameters necessary to describe the shape. Therefore, not all geometric parameters of the reference objects 10 need to be known, but only those corresponding to an approximation of the shape of the reference objects 10 and which are used by the light diffraction model.

The size of the reference object 10 is not important, and can have a diameter (larger dimension) ranging from 10 nm to 100 μm, for example. The size of the reference object 10 depends on secondary aspects. On the one hand, the size of the reference object 10 should enable sufficient contrast to be generated, taking the wavelength of the illumination light into account, the index difference with the medium around the reference object 10, or even the contrast generated by other objects in the holographic image. The diameter of the reference object 10 is thus preferably greater than 10 nm, and still preferably greater than 100 nm. On the other hand, the projected area of the reference objects 10 on the image sensor 2 should not be too large so as not to alter the quality of the holographic image. Typically, a projected area of less than 10% (and still preferably less than 1%) will allow good holographic image quality, if otherwise the rest of sample 1 is not too dense. Furthermore, the reference objects 10 should not mask the rest of the sample 1, and in particular the surface of interest 6. The size of the reference objects 10 is therefore chosen so as not to take up too much space in the field-of-view of the image sensor 2. In this respect, the reference objects 10 are preferably distant from each other, not adjacent, and are preferably distributed over the entire field-of-view of the image sensor 2, in a scattered manner.

A reference object 10, like any material, has a refractive index. As the reference object 10 is distinct from the rest of the sample 1, its refractive index differs from the surrounding medium, even very slightly. Thus, a refractive index of a reference object 10 which differs by 0.01 from the refractive index of the medium surrounding the reference object 10 makes it possible to identify its impact on light diffraction in an acquired image, and therefore to implement the method. Preferably, however, the refractive index of the reference object 10 differs by at least 0.05 from the refractive index of the part of sample 1 immediately adjacent to the reference object 10, and preferably by at least 0.1. The refractive index of the reference object 10 is preferably known and entered in the light diffraction model. In particular, in the case where the reference object 10 is opaque, that is, the complex component of its refractive index can be considered as tending towards infinity at the wavelength under consideration, the light diffraction model can be modified accordingly in order to limit the number of parameters to be adjusted to reduce the calculation time, and to avoid possible over-adjustment. In the case of a transparent or partially transparent reference object 10, the refractive index of the reference object 10 can also be unknown, or known inaccurately, and can be estimated in the same way as the geometric or position parameters associated with the reference object 10, via the use of the diffraction model, and thus be part of the characterising parameters associated with the reference object 10.

The sample 1 may comprise an immersion medium 14, and the light diffraction model may involve a refractive index of said immersion medium 14, which is estimated by adjustment in the light diffraction model to approximate the interference patterns caused by the reference object in the holographic image, in the same way as the characterising parameters associated with the object, through the use of the diffraction model.

Apart from the fact that the reference object 10 should have a known shape described by the characterising parameters associated therewith, or then a very small size with respect to the wavelength of the illumination light, few restrictions matter for the choice of a reference object 10. A reference object 10 may be opaque or transparent, and may consist of various materials, such as silica, polystyrene, or a metal such as gold. In the light of the above considerations, a reference object 10 may be an artificial object added to the sample 1. The advantage of adding an artificial reference object lies mainly in the refined knowledge of its geometric parameters and refractive index, as well as the regularity of its shape. In the case of artificial reference objects 10 added to the sample 1, these are chosen to have a simple regular shape, preferably cylindrical or ellipsoidal, and still preferably a spherical shape, in order to allow the best adequacy between the actual shape of the reference object 10 and its approximation described by the characterising parameters taken into account by the diffraction model. For example, in the case shown in FIG. 2, the reference objects 10 are opaque polystyrene balls with a diameter of 1 μm.

The reference object 10 may also be present on the holder 12 of the sample 1, forming part of the holder 12 at its interface with the sample 1. For example, it is possible to etch, for example by photolithography, the surface 12a of the holder 12 to reveal preferably rounded shapes which can meet the requirements of a reference object (for example, rounded nibs).

A reference object 10 may also be a micro-organism present in the sample 1. For example, the bacterium *Staphylococcus epidermidis* has a quasi-spherical shape, with a known size in a certain range (can therefore be estimated by adjustment), as well as a refractive index known also in a certain range (can therefore be estimated by adjustment). In addition, it is a human commensal bacterium, typical of the flora of the skin, and therefore likely to be commonly present in a sample to be imaged (naturally or by contamination). Other types of micro-organisms may be used, as long as they have a shape that can be described by geometric parameters likely to be taken into account by the light diffraction model, and as their size and refractive index can be estimated. Natural constituents from the sample 1 can thus be advantageously used. It should be noted that it is possible to use both inert artificial objects added to the sample 1 and microorganisms present in the sample 1.

As previously discussed, the reference object 10 is located at a position in correspondence with the position of the surface of interest 6, that is, there is a correspondence relationship between the position of the surface of interest 6 and the position of the reference object 10. If certain configurations do not present any problems, for example, in the case where the reference object 10 is naturally present in the sample 1 at the surface of interest 6 (for example, in the case of microorganisms), or when the surface of interest 6 coincides with a surface of the holder 12 on which reference objects 10 are formed, other configurations may sometimes need to take precautions to ensure the correspondence between the position of a reference object 10 and the surface of interest 6. When the surface of interest 6 coincides with the surface 12a of the holder 12, or is bound to this surface 12a of the holder 12 for example by a parallelism relationship, it is possible to deposit the reference objects 10 directly on the surface 12a of the holder 12 before placing the rest of the sample 1 on the holder 12. Thus, a fluid immersion medium 14 (for example, water) containing the suspended reference objects 10 can be deposited beforehand on the surface 12a of the holder 12 before placing the rest of the sample 1.

Once the sample 1 is placed, the sample 1 is illuminated by the illumination light, and the image sensor 2 acquires at least one two-dimensional holographic image. This may be an image acquired in isolation, or a series of images, and in particular a series of holographic images acquired for different positions of the acquisition plane 2' relative to the sample 1 along the optical axis 5 and/or with different wavelengths for illumination light.

These different positions of the acquisition plane 2' relative to the sample 1 can be obtained by different positions of the sample 1 along the optical axis 5 relative to the image sensor 2, for example by displacing the sample 1 and its holder 12 on the optical axis between each image acquisition by a motor-driven stage. It is also possible to displace the image sensor 2, for example via a motor-driven rail or motor-driven stage. It is also possible to obtain these different positions of the acquisition plane 2' by modifying an optical member of the holographic imaging system displacing the acquisition plane 2', by modifying a focusing of light beams incident to the image sensor 2 in order to displace the acquisition plane 2' from the image sensor 2.

Just as any type of holographic imaging system can be used as discussed above, various holographic image acquisition techniques may be used, as long as the acquired image reveals the optical effects of the presence of the reference objects 10 in the field-of-view of the digital image sensor 2, and in particular the interference figures generated by interference between the illumination light and the light scattered by the reference objects 10, appearing in the holographic image as interference patterns caused by the reference object. It goes without saying, however, that the image is acquired with the holographic imaging system in a configuration adapted to image the reference objects 10 (or rather the interference patterns caused by them), and therefore with the appropriate settings (illumination, etc.) common to the skilled person.

Figure 3:
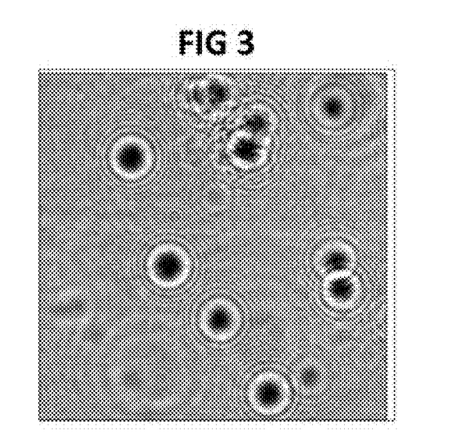
FIG. 3 is an example of a holographic image of a sample comprising several polystyrene balls as reference objects.

FIG. 3 shows an example of a two-dimensional, intensity holographic image acquired by an image sensor 2 of a holographic imaging system. The reference objects 10 here are opaque polystyrene balls with a diameter of approximately 1 µm placed on the surface of a holder 12. This sample is imaged by illumination light at a wavelength of approximately 510 nm.

Once the holographic image has been acquired, the position of the reference object 10 or several reference objects 10 with respect to the acquisition plane 2' is determined. To do so, a light diffraction model is used by the reference object 10. The diffraction model is used to detect a reference object 10 in the holographic image acquired and determine its position with respect to the acquisition plane 2'. The diffraction model makes it possible, from the characteristics of the reference object 10, to predict the interference generated by the presence of the reference object 10 in the field-of-view, and therefore the appearance of the reference object 10 in the holographic image acquired, as a function of its position with respect to the acquisition plane 2'. More precisely, the light diffraction model takes account of the geometric parameters of the reference object 10 and the position coordinates of the reference object 10, as well as possibly the refractive index of the reference object 10. Other parameters may be taken into account, and particularly the index of immersion medium 14, or characteristics of the holographic imaging system such as the wavelength of illumination light, magnification, digital aperture, etc. However, these other parameters are design elements of the instrument, known and fixed by the user. They therefore only correspond to settings, which anyway do not vary for different reference objects 10 in the same image. Thus, the important parameters are the geometric parameters of the reference object 10 and the position coordinates of the reference object 10, and to a lesser extent its optical characteristics (in particular its refractive index).

The characterising parameters associated with the reference object are the variables adjusted to best match the interference figures described by the model with the interference patterns appearing in the holographic image acquired. The parameters associated with the reference object 10, or at least the position coordinates of the reference object, are estimated by adjustment in the light diffraction model to approximate the interference patterns caused with the reference object in the holographic image acquired. The adequacy between interference figures described by the diffraction model and the interference patterns appearing in the holographic image acquired makes it possible to determine that the characterising parameters (position parameters, geometric parameters, and optical parameters) used in the diffraction model are those of the reference object 10. This estimation can be made by minimising one criterion. This may be an inverse problem approach based on likelihood maximum, and/or including an a priori (for example, a quadratic reminder of the expected values of the geometric and optical parameters) and/or restrictions (for example, on the range of accepted values of the geometric or optical parameters). For example, under a hypothesis of Gaussian random noise on the intensity sensed by each of the pixels of the digital image sensor 2, it may be a least squares method, possibly weighted, between data D (that is, the image acquired) and a model M of light diffraction by the interaction of the incident wave and the reference object, dependent on a vector of spatial parameters V describing this reference object, and predicting the electromagnetic field and in fine the intensity in the image plane where the image sensor 2 is. With the reference object 10 as a sphere with a radius r whose centre is located at the coordinates (x, y, z), the vector of parameters to be estimated takes the form $V=(x, y, z, r)^t$, and the estimation E of the parameters is determined by minimising the standard L2 of the difference between the data D and the model M applied to the vector of parameters to be estimated V:

$$E := \operatorname*{argmin}_{V} \|M(V) - D\|_W^2$$

where W is an optional weighting matrix that can take account of dead or missing pixels, or allow the noise covariance matrix to be considered. In this example, the reference object 10 is assumed to be spherical and the model can typically be the Mie model. Other shapes of a reference object 10 can be considered, with other geometric parameters describing these shapes. In particular, the light diffraction model is chosen as a function of the known shape of the reference object 10, and the model may be for example the Mie model, the generalised Mie model, the Thompson model, or the Rayleigh model, or the Rayleigh-Sommerfeld propagation model. The Mie model is particularly adapted to spherical reference objects 10 of a size comparable to the wavelength of the illumination light, the generalised Mie model preferably applying to cylindrical or ellipsoidal shaped objects; the Thompson model applying to opaque spherical objects, and the Rayleigh model preferably applying to reference objects 10 of a size of less than 5 to 10 times the wavelength of the illumination light, and of any shape.

Moreover, when the refractive index is one of the characterising parameters to be estimated by adjustment in the diffraction model, it can be added to the vector of the parameters to be estimated, in the same way as the geometric and position parameters. In the above example, the vector of parameters to be estimated would take the form $V=(x, y, z, r, n)^t$ with n the refractive index of the reference object 10. It is also possible to estimate other parameters involved in the diffraction or propagation of light on which uncertainty would arise. Preferably, however, the number of parameters to be estimated is reduced as much as possible so as not to alter the accuracy of the method.

Preferably, several reference objects 10 are present in the field-of-view of the image sensor 2 and appear in the holographic image acquired. Determining the position of each reference object 10, by determining their respective position parameters with respect to the acquisition plane 2', is preferably carried out iteratively, reference object 10 after reference object 10, preferably by subtracting from the data of the holographic image acquired each time the appearance of a reference object 10 whose characterising parameters associated with said reference object 10 have been previously determined. In particular, it is possible to apply a greedy type algorithm.

As long as more than three non-aligned reference objects appear on the holographic image acquired, it is possible to determine not only the relative position of the reference objects on the optical axis 5 (z-coordinates) with respect to the acquisition plane 2', but also the orientation of the so-called reference surface in which these reference objects 10 are arranged. Thus, determining the position of the surface of interest 6 may include, following determining the positions of the reference objects 10, determining a reference surface in which these reference objects 10 are arranged, for example by interpolation of the position coordinates of the reference objects 10 with respect to the acquisition plane 2' to determine parametric coordinates of this reference surface in which the reference objects 10 are arranged. The position of the surface of interest 6 can then be determined with respect to this reference surface by means of the correspondence between the reference surface and the surface of interest 6.

Figure 4:
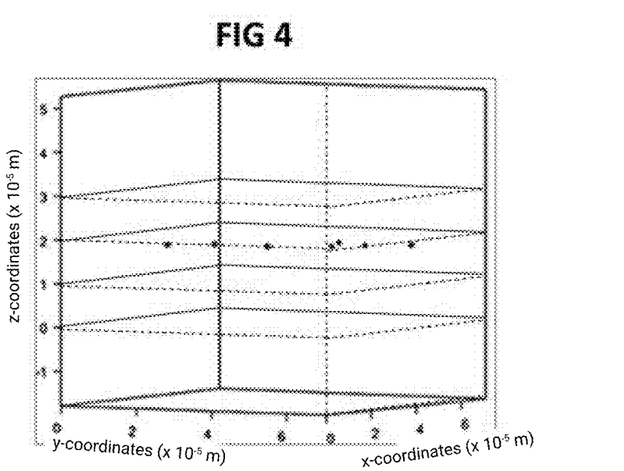
FIG. 4 is a three-dimensional model showing the positions of reference objects of the image of FIG. 3, determined by the method according to one possible embodiment of the invention.

FIG. 4 is a three-dimensional representation showing the positions of seven reference objects 10 of the image in FIG. 3, with respect to the acquisition plane 2', these positions being determined by adjustment of a Mie model of light diffraction, involving the position, geometric and optical parameters of the balls, in this case the position coordinates (x, y, z), the radius of the balls, and their refractive index. Each point represents a centre of a ball. The coordinates are given in tens of micrometres, both for the optical z-axis 5 and for the x- and y-coordinates perpendicular to the optical z-axis 5. FIG. 4 shows that the reference objects 10 are well arranged on a reference plane, in this case that of the surface 12a of the holder 12 on which they rest.

In the example in FIG. 4, the reference surface 6' whose position could be determined is the surface 12a of the holder 12 on which the balls are deposited. This is a particularly advantageous special case, but another reference surface could have been chosen, such as the centre of the balls, which are z-offset from the holder 12 by a distance corresponding to the radii r of the balls. However, such a surface passing through the centre of the balls may be irregular and not planar, if not all balls have the exact same radius. It is therefore preferable to choose as the reference surface 6' the surface 12a of the holder 12 which is in principle planar and does not depend on the regularity of the radii of the balls.

Once the position of a reference object 10 has been determined with respect to the acquisition plane 2', via its position parameters (typically its position coordinates), it is possible from the position parameters of the reference object 10 to determine the position of the surface of interest 6 with respect to the acquisition plane 2', since the reference object 10 is at a position corresponding to the position of the surface of interest 6. In the case where parametric coordinates of a reference surface 6' in which the reference objects 10 are arranged have been determined, the position of the surface of interest 6 can be determined from the parametric coordinates of this reference surface 6'.

The position of the surface of interest 6 can coincide with the position of the reference object 10, which is the simplest of the correspondences. Thus, in the example in FIG. 4, if the surface of interest 6 coincided with the interface between the sample 1 and the holder 12, the position of the reference object 10 or reference surface 6' derived therefrom, would directly give the position of the surface of interest 6 with respect to the acquisition plane 2'. The position of the surface of interest 6 may not coincide with the position of the reference object 10, but there is always a correspondence between the position of the surface of interest 6 and the position of the reference object 10. In this case, the position of the surface of interest 6 can be defined with respect to the position of the reference object 10. This correspondence can, for example, be an offset in one direction, especially along the optical axis 5.

In the example in FIG. 4, the position of the surface of interest 6 corresponds to the middle of the reference objects 10 resting on the surface 12a of the holder 12. In the example in FIG. 4, the surface of interest 6 whose position can be determined from the positions of the reference objects 10 is thus not the surface 12a of the holder 12 forming the interface between the sample 1 and the holder 12, but can be defined with respect to the centre of the balls, by a simple translation along the optical axis 5. It is sufficient to take account of the positions of the balls on the surface 12a of the holder 12 as the reference surface 6', and offset the z-coordinates by a value corresponding to once the radius r of the balls, which may have been determined as a geometric parameter forming the characterising parameters associated with each reference object 10. It is easy to choose another surface of interest 6. For example, if it is desired to know the position of the top of the balls forming another surface of interest 6, a translation of twice the radius of the balls from the surface 12a of the holder 12 taken as the reference surface 6' is sufficient.

For example, if the sample 1 contains 2 μm thick microorganisms resting on the holder 12, the surface of interest 6 can be chosen as passing through the centres of these bacteria; and therefore the surface of interest 6 will be defined by a 1 μm offset from the surface 12a of the holder 12 taken as the reference surface 6'. However, other offsets may be possible. If the surface of interest 6 coincides with the surface in which the centres of the balls are arranged, it can therefore be determined that the surface of interest 6 formed by the plane of the centres of the balls is on the optical axis 5 at a distance of about 17.5 µm from the acquisition plane 2'. Advantageously, as in these examples, the correspondence between the position of the reference surface and the position of the surface of interest 6 may depend on geometric parameters of the reference object 10. However, this is not necessary. For example, it may be desired to image a surface of interest 6 located at a given distance, not related to the geometric parameters of the reference objects, with respect to the reference objects 10. To image a surface of interest 6 to 5 µm from the surface 12*a* of the holder 12, a 5 µm translation with respect to the z-coordinates (along the optical axis 5) of the bottom of the balls is sufficient.

With only one reference object 10, the only position information relevant for the focus adjustment that can be determined is the position of the reference object 10, and therefore of the surface of interest 6, along the optical axis 5, via the z-coordinate of the reference object 10. However, this is the most valuable information, since this knowledge alone of the position of the surface of interest 6 on the optical axis 5 enables the focus adjustment of the imaging system for image acquisition, that is, it makes it possible to ensure that an image of the surface of interest 6 is acquired in the focal plane of the holographic imaging system. The reference surface 6' is then a reference plane perpendicular to the optical axis 5, and whose z-coordinate is that of the reference object 10 (for example, its centre or its side).

Preferably, the sample 1 comprises at least three reference objects 10 in the field-of-view of the image sensor 2, whose position parameters with respect to acquisition plane 2' are determined, and preferably at least five reference objects 10. Having position parameters with respect to the acquisition plane 2' of several reference objects 10 makes it possible to improve the accuracy of the determination of the position of the surface of interest 6 with respect to the acquisition plane, by using a combination of position parameters such as position coordinates of several reference objects 10, and for example by averaging their z-coordinates. Having a plurality of position coordinates makes it possible, through the use of x- and y-coordinates, defined in a plane perpendicular to the optical axis 5, also to determine a possible tilt of the reference surface in which the reference objects 10 are arranged with respect to the acquisition plane 2', and therefore a possible tilt of the corresponding surface of interest 6. As previously discussed, parametric coordinates of the reference surface can be determined for this purpose. The plurality of position coordinates also makes it possible to estimate the accuracy of the position determination, for example by determining statistical scatter estimators of the results, such as a standard deviation.

Similarly and to further improve accuracy, it is possible to work from several holographic images acquired by the image sensor 2 at different positions of the acquisition plane 2'. For each of the holographic images, the position of the at least one reference object 10 with respect to the acquisition plane 2' of said holographic image is determined, and determining the position of the surface of interest 6 involves several positions of the at least one reference object 10 for different positions of the acquisition plane 2'. It is also possible to work from several holographic images acquired by the image sensor 2 with different wavelengths for illumination light, in order to take account of different optical effects depending on the wavelength of the illumination light.

Once the position of the surface of interest 6 with respect to the acquisition plane 2' has been determined, the focus adjustment of the image acquisition can be performed on the basis of the position of the surface of interest 6 with respect to the acquisition plane 2'. Focus adjustment consists in making the positions of the surface of interest 6 and of the object focal plane coincide, corresponding to the acquisition plane 2'.

Focus adjustment may comprise the relative displacement of the sample 1 or the image sensor 2 along the optical axis 5, over a displacement distance derived from the position of the surface of interest 6 with respect to the acquisition plane 2'. Focus adjustment may consist in displacing the sample 1 along the optical axis 5, for example by means of a rail or a motor-driven stage displacing the holder 12, so that the position of the surface of interest of the sample 1 coincides with the acquisition plane 2' of the image sensor 2. It is also possible to modify an optical member of the imaging system displacing the acquisition plane 2' to make it coincide with the position of the surface of interest. A subsequently acquired image thus allows the surface of interest to be imaged with focus adjustment on this surface of interest 6. Although it is clear that this image acquired as a result of focus adjustment may advantageously be a holographic image, it should be noted that this image acquired as a result of focus adjustment is not necessarily a holographic image. For example, it is possible to use a holographic image only for focus adjustment and then to acquire an image using other acquisition methods, such as for example white light.

Another focus adjustment mode is to use a digital focus adjustment method, also called holographic reconstruction, comprising transforming the holographic image acquired using a propagation model involving the position of the surface of interest 6 with respect to the acquisition plane 2'. A convolution of image data by a complex function allows the focal plane to be displaced a posteriori with respect to the imaged objects. In particular, the Rayleigh-Sommerfeld propagation model can be used. For example, Chapter 3 of the second edition of Joseph W. Goodman's book, "Introduction to Fourier optics", McGraw Hill Higher Education, 1996, describes this model. Focus adjustment by a digital method on an already acquired image enables the use of a mechanical focusing system to be dispensed with.

Figure 5:
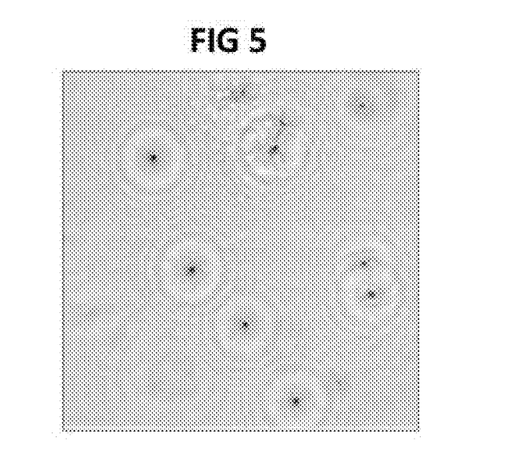
FIG. 5 shows the result of a digital focus adjustment of the image of FIG. 3 from the positions of reference objects, determined by the method according to one possible embodiment of the invention.

FIG. 5 shows the result of a digital (or "computational") focus adjustment applied to the image in FIG. 3 by Rayleigh-Sommerfeld propagation reconstruction, in which the focal plane has been displaced to correspond to a surface of interest 6 chosen as passing through the centre of the balls (the reference surface corresponding to the surface 12*a* of the holder 12 on which the balls rest). While some artefacts (halos around the balls) can be observed, it should be noted however that the balls are clearly visible, as if they had been placed directly in the acquisition plane 2' during image acquisition.

The result of the above described method shows that it is possible to perform a focus adjustment for acquiring an image of a surface of interest 6 of a sample 1 by an image sensor 2 of an imaging system very accurately, without requiring specific equipment and without major restrictions on the imaging system, in addition to the ability to acquire a holographic image first. This method can therefore be applied to all existing imaging systems capable of acquiring a holographic image.

The invention is not limited to the embodiment described and represented in the appended figures. Modifications remain possible, in particular with regard to the constitution of the various technical characteristics or by substitution of technical equivalents, without however departing from the protection scope of the invention.

The invention claimed is:

1. A focus adjustment method for acquiring an image of a surface of interest from a sample by an image sensor from an imaging system, comprising the following steps of:
   placing the sample in which the surface of interest is, in a field-of-view of an image sensor of the imaging system, the sample comprising at least one physical reference object having a known shape and described by characterising parameters associated with the reference object, these characterising parameters comprising at least position parameters of the reference object, the reference object being at a position in correspondence with a position of the surface of interest,
   illuminating the sample by an illumination light and acquiring a holographic image by the image sensor at an acquisition plane, of interference patterns caused by the reference object,
   determining the position of the reference object with respect to the acquisition plane, using a light diffraction model by the at least one reference object, the light diffraction model being based on the known shape of the reference object and involving the characterising parameters of the reference object, at least the position parameters of the reference object being estimated by adjustment in the light diffraction model to approximate the interference patterns caused by the reference object appearing in the holographic image,
   determining the position of the surface of interest with respect to the acquisition plane from a position of the reference object defined by the position parameters,
   performing focus adjustment of the image acquisition based on the position of the surface of interest with respect to the acquisition plane, focus adjustment consisting in making the positions of the surface of interest and of an object focal plane coincide, corresponding to the acquisition plane.

2. The method of claim 1, wherein the reference object is an artificial object added to the sample, or the reference object is a microorganism present in the sample.

3. The method of claim 1, wherein the reference object has a spherical, cylindrical, or ellipsoidal shape.

4. The method of claim 1, wherein the light diffraction model is the Mie, generalised Mie, Thompson, or Rayleigh model.

5. The method of claim 1, wherein the characterising parameters associated with a reference object also comprise geometric parameters describing the known shape of the reference object.

6. The method of claim 5, wherein the geometric parameters of the reference object are estimated by adjustment in the light diffraction model to approximate the interference patterns caused by the reference object in the holographic image.

7. The method of claim 1, wherein the characterising parameters associated with the reference object comprise a refractive index of the reference object which is estimated by adjustment in the light diffraction model to approximate the interference patterns caused by the reference object appearing in the holographic image.

8. The method of claim 1, wherein the sample is placed in an immersion medium, and the light diffraction model involves a refractive index of said immersion medium which is estimated by adjustment in the light diffraction model to approximate the interference patterns caused by the reference object appearing in the holographic image.

9. The method of claim 1, wherein the sample comprises at least three reference objects not aligned in the field-of-view of the image sensor whose position parameters with respect to the acquisition plane are determined, and determining the position of the surface of interest comprises determining a position of a reference surface in which the reference objects are arranged, the position of the surface of interest being determined from the position of the reference surface by the correspondence between the positions of the reference objects and the position of the surface of interest.

10. The method of claim 9, wherein the position parameters of the reference objects comprise position coordinates with respect to the acquisition plane, and the position of the reference surface is determined by interpolation of the position coordinates followed by a determination of parametric coordinates of the reference surface with respect to the acquisition plane.

11. The method of claim 1, wherein several holographic images are acquired by the image sensor at different positions of the acquisition plane, and for each of the holographic images, the position of the at least one reference object with respect to the acquisition plane of said holographic image is determined, the determination of the position of the surface of interest involving several positions of the at least one object.

12. The method of claim 1, wherein the focus adjustment of the image acquisition comprises a relative displacement of the sample and the image sensor at least along an optical axis of the imaging system, over a displacement distance derived from the position of the surface of interest with respect to the acquisition plane.

13. The method of claim 1, wherein the focus adjustment of the image acquisition comprises modifying an optical member of the imaging system displacing the acquisition plane.

14. The method of claim 1, wherein the focus adjustment of the image acquisition is a digital focus adjustment comprising transforming the holographic image acquired using a propagation model involving the position of the surface of interest with respect to the acquisition plane.

15. An imaging system comprising:
   an image sensor configured to acquire a holographic image at an acquisition plane in a field-of-view,
   a light source configured to illuminate a sample disposed in the field-of-view of the image sensor, the sample comprising a surface of interest and comprising at least one physical reference object having a known shape and described by characterising parameters associated with the reference object, these characterising parameters comprising at least position parameters, the reference object being at a position in correspondence with the position of the surface of interest,
   an automated data processing system configured to receive the holographic image acquired by the image sensor and to determine the position of the reference object with respect to the acquisition plane, using a light diffraction model by the at least one reference object, the diffraction model being based on the known shape of the reference object and involving the characterising parameters associated with the reference object, at least the position parameters of the reference object being estimated by adjustment in the light diffraction model to approximate the interference patterns caused by the reference object in the holographic image, and to determine the position of the surface of interest with respect to the acquisition plane from a position of the reference object defined by the position parameters, the holographic imaging system being configured for an implementation of a focus adjustment method for acquiring an image of the surface of interest of the sample by the image sensor according to claim 1.

16. The method of claim 1, wherein several holographic images are acquired by the image sensor with different wavelengths for the illumination light, and for each of the holographic images, the position of the at least one reference object with respect to the acquisition plane of said holographic image is determined, the determination of the position of the surface of interest involving several positions of the at least one object.

17. The method of claim 1, wherein several holographic images are acquired by the image sensor at different positions of the acquisition plane and with different wavelengths for the illumination light, and for each of the holographic images, the position of the at least one reference object with respect to the acquisition plane of said holographic image is determined, the determination of the position of the surface of interest involving several positions of the at least one object.

* * * * *